United States Patent
Flottmann et al.

(10) Patent No.: US 6,260,712 B1
(45) Date of Patent: Jul. 17, 2001

(54) AIR SEPARATION OF POLYSILICON

(75) Inventors: Dirk Flottmann, Altötting; Matthäus Schantz, Reut; Johann Heiss, Tittmoning, all of (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/378,039

(22) Filed: Aug. 20, 1999

(30) Foreign Application Priority Data

Aug. 27, 1998 (DE) .............................................. 198 39 024

(51) Int. Cl.[7] ...................................................... B07C 5/00
(52) U.S. Cl. ........................... 209/639; 209/644; 209/932
(58) Field of Search ..................................... 209/133, 134, 209/135, 638, 639, 644, 932

(56) References Cited

U.S. PATENT DOCUMENTS

| | | | |
|---|---|---|---|
| 4,857,173 | 8/1989 | Belk | .......................................... 209/2 |
| 5,413,222 * | 5/1995 | Holder | ............................... 209/639 X |
| 5,791,489 * | 8/1998 | Leifeld | ................................. 209/44.1 |

FOREIGN PATENT DOCUMENTS

| | | | |
|---|---|---|---|
| 56433 * | 6/1967 | (DE) | ..................................... 209/639 |
| 2556548 | 6/1977 | (DE) . | |
| 2852313 | 6/1979 | (DE) . | |
| 87 03 776 | 6/1987 | (DE) . | |
| 2009627 | 6/1979 | (GB) . | |
| 1669590 * | 8/1991 | (SU) | ..................................... 209/639 |
| 1708443 * | 1/1992 | (SU) | ..................................... 209/639 |

OTHER PUBLICATIONS

Derwent Abstract corresponding to DE 2556548 (AN 1977 –F 3382Y [26]).

* cited by examiner

Primary Examiner—Tuan N. Nguyen
(74) Attorney, Agent, or Firm—Collard & Roe, P.C.

(57) ABSTRACT

A separation device which has at least one blower device and at least one deflector device can be used to separate large fragments of semiconductor material from small fragments of semiconductor material.

7 Claims, 2 Drawing Sheets

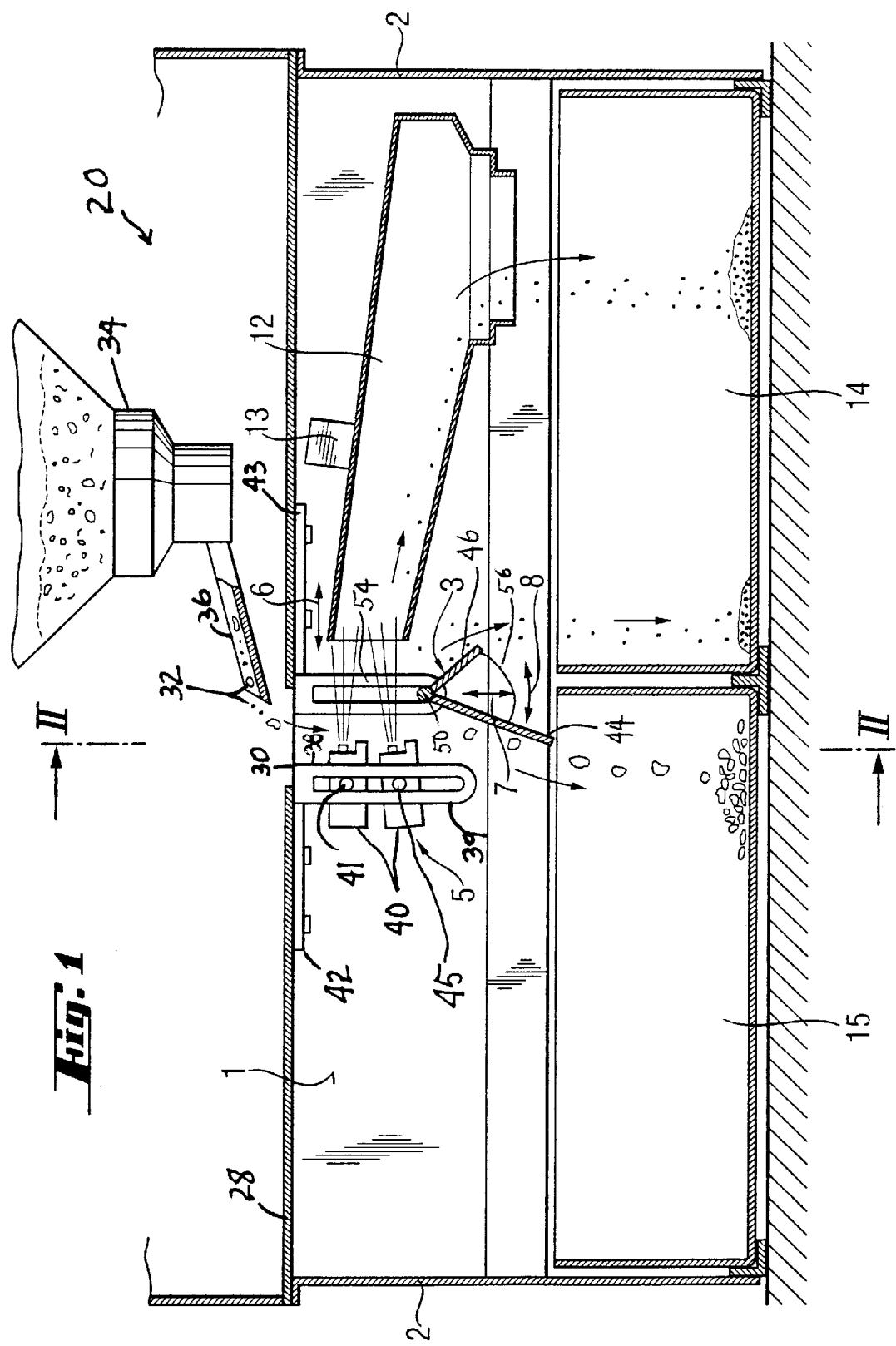

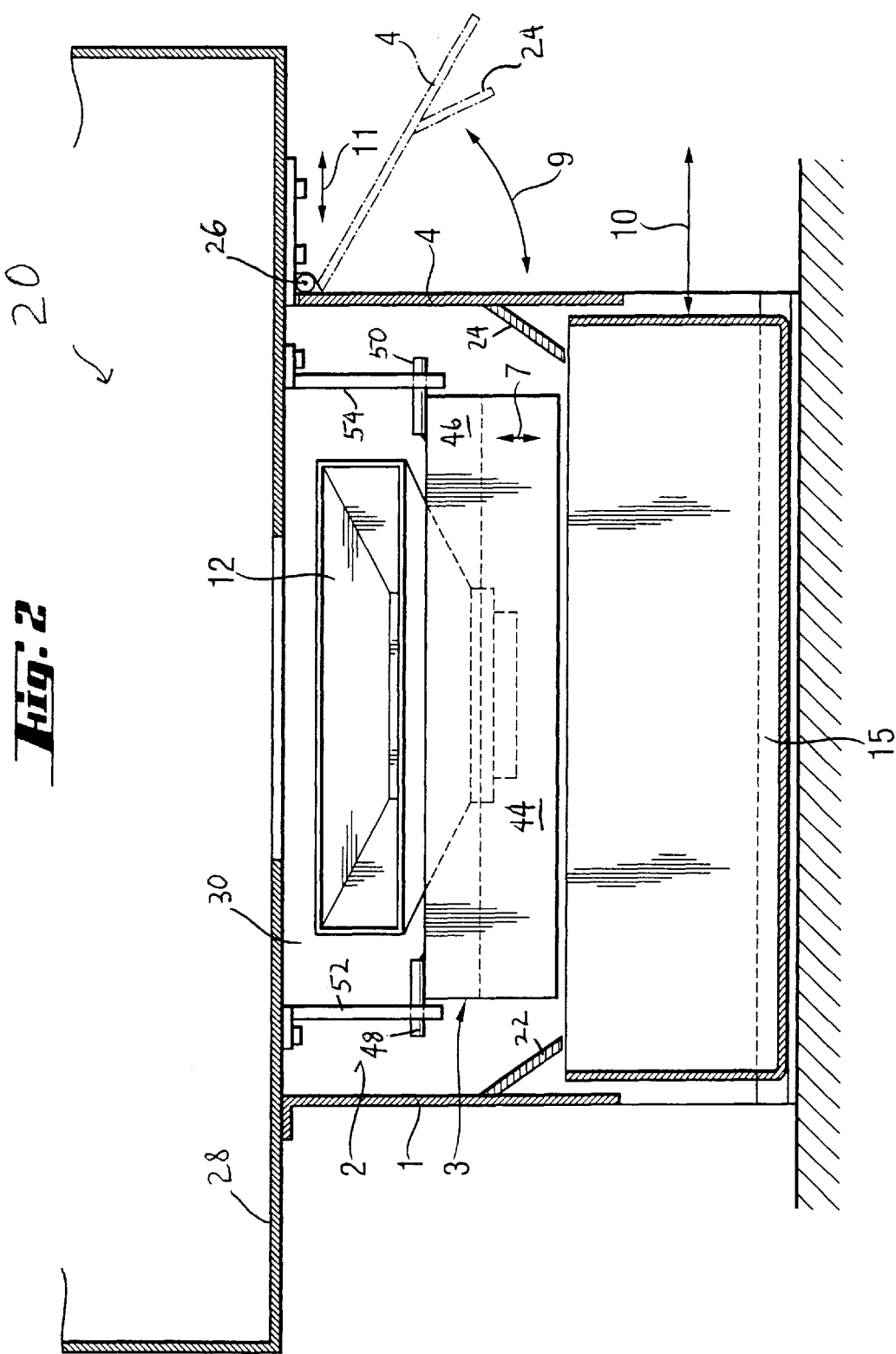

AIR SEPARATION OF POLYSILICON

BACKGROUND OF THE INVENTION

1. Field of the Invention

The present invention relates to a device and a method for separating semiconductor fragments.

2. The Prior Art

Numerous semiconductor materials have to be comminuted for the melting operation in the crucible. In this case, it is imperative that no contamination and fine dust enter the crucible together with the semiconductor fragments. The contamination may reside within the bulk of the material or on its surface. Previously, contamination on the surface, such as contamination formed by the crushing operation or by the previous screening, sifting and separation methods, has been removed in water baths or in acid baths. The drawback of these cleaning methods is the low efficiency and the high costs of using acid. The use of acid is not generally able to remove the extremely undesirable abraded plastic material from the edges of the crusher bars.

Due to the constant contact between materials and the permanent load on the screen material, screening of the polysilicon, for example, by means of a dry screen leads to contamination, abrasion and fine dust which are reflected as problems in the product quality. In addition, the irregular shape of the polycrystalline silicon powder quickly results in blockage of the apertures, e.g. of the gaps in a bar screen or the apertures in a perforated screen.

Wet separation also fails to allow powder sizes to be controlled accurately and reproducibly. This is because the adhesion forces cause the small pieces to adhere to one another and, in particular, to adhere to larger fragments. This presents difficulties not only for controlling the powder sizes but also for discharging the material.

The opto-electrical separation method is also currently unsuitable for delivering the fine powder and dust (max. fragment sizes less than 2 cm). This is because digital measuring technology is not yet able to handle particle streams of greater than 6000 pieces/second of the dimensions indicated above.

SUMMARY OF THE INVENTION

It is an object of the present invention to overcome the drawbacks of the prior art and, in particular, to separate semiconductor fragments without contamination.

The above object is achieved by the present invention by providing a separation device which has at least one blower means and at least one deflector means.

BRIEF DESCRIPTION OF THE DRAWINGS

Other objects and features of the present invention will become apparent from the following detailed description considered in connection with the accompanying drawings which discloses several embodiments of the present invention. It should be understood, however, that the drawings are designed for the purpose of illustration only and not as a definition of the limits of the invention.

In the drawings, wherein similar reference characters denote similar elements throughout the several views:

FIG. 1 shows a diagrammatic cross section view through a device according to the invention; and FIG. 2 shows a sectional view along line II—II of FIG. 1.

DETAILED DESCRIPTION OF PREFERRED EMBODIMENTS

Turning now in detail to the drawings, FIGS. 1 and 2 show the device or apparatus according to the invention. This apparatus 20 (or device 20) essentially has a rear wall 1 and a front wall 4 which is located opposite the rear wall, as well as side walls 2 which connect the front and rear walls. Inwardly directed diverter plates 22 and 24 are respectively provided on the inside of the rear wall 1 and of the front wall 4. The front wall 4 can pivot about a horizontal longitudinal axis pivot 26 and/or can move horizontally in the direction of arrow 11, in such a manner that the interior is accessible, for example for maintenance work. The collection troughs 14, 15, which are arranged inside the walls, for the separated material can be removed from or supplied to the device in the area of the front wall 4 via guide rails. The pivot angle 9 of the front wall 4 is preferably 0° to 120°, particularly preferably 80° to 90°. Furthermore, the device 20 has a covering wall 28 which essentially spans the walls 1, 2 and 4 and, in its central area, is provided with preferably one insertion opening 30 for feeding in semiconductor fragments 32 which are to be separated.

The device according to the invention is intended for the separation preferably of semiconductor fragments. The semiconductor fragments are fed to the device 20 via a feed supply means 34 which is indicated diagrammatically in FIG. 1. Supply means 34 has an inclined chute 36, the angle of inclination of which can be adjusted, in such a manner that, as a result of the inclined feed chute 36 and the vertically acting force of gravity, the semiconductor fragments are introduced into the active separation area 38 of the air cone in a curved path. The nozzles are held in vertical channel 39 of the blower means 5 which has at least one, and preferably up to 10 or more, individual nozzles 40. The nozzles are adjustably held in channel 39 due to nozzle mounting pins 41 and 45. It is also possible for a plurality of rows to be arranged above one another. In addition, it is also possible for the nozzles to be arranged next to one another.

The objective is to achieve a homogenous air flow across the active separation area width used. The nozzles are preferably directed upwardly away from the bottom base line at an angle of from 0° to 20°. Preferably, gas, e.g. air or an inert gas, e.g. nitrogen, is blown out of the nozzles at a pressure which is adapted to the material to be separated or to the separation objective, preferably at a pressure of from 1 to 4 bar. It may also be advantageous to use liquid, e.g. water, in the nozzles. The blower means is preferably attached by blower mounting means 42 so as to be horizontally displaceable. The nozzles are vertically and pivotably displaceable due to nozzle pins 41 and 45, which enable the nozzles to move vertically in nozzle channel 39 and to rotate around pins 41 and 45 in channel 39.

As a result of the semiconductor fragments being supplied in this way, the irregularly shaped semiconductor fragments are guided into the active separation area 38 of the blower means 5 with their center of gravity at the front. Thus the main force of the air is directed at the fragment center of gravity. This ensures the reliability and reproducibility of the fragment separation.

A deflector means 3, which is essentially formed by two metal sheets or arms 44 and 46 arranged in the form of an inverted V-shaped roof, is provided beneath the blower means 5. The roof arms or sheets 44 and 46 form deflector ridges of the deflector means 3 which is aligned transversely with respect to the blowing direction of the nozzles. The deflector is constructed so that it can be adjusted in the horizontal direction by horizontal moving means 43 and in the vertical direction by vertical bearing channel 54 as indicated by the arrows 6 and 7. Thus the separation level can be suitably controlled. The deflector means 3 is held by means of bearing pins 48 and 50 in vertical bearing channels 52 and 54 in such a manner that it can pivot in the direction of arrow 8 within a range of from 0° to 90°, preferably 0° to 20°. The angle 56 between the metal arms 44 and 46 forming the roof ridge surfaces of the deflector means 3 can preferably be displaced as far as the blower means 5, preferably being 45° to 120°, particularly preferably 85° to 90°. The fine dust smaller particles of the fragments which are to be separated are transferred into the collection trough 14 via the deflector means 3. The larger-sized fraction of the larger semiconductor fragments which are to be deflected falls into the collection trough 15. Preferably, the fine dust particles can also be conveyed into the collection trough 14 via a collector 12. The collection troughs 14 and 15 can be removed from the device in the direction of arrow 10.

The arm 46 is of shorter length than the longer length arm 44. Preferably, arm 46 is from one-third to two-thirds the length of arm 44. Arm 46 can be one-half the length of arm 44.

The mass fraction which is to be separated is determined by the air pressure in the nozzles and by the relative position of the deflector means 3. It is thus possible to reproducibly separate semiconductor material comprising particles whose diameter preferably lies in the range from 1 $\mu$m to 20 mm, particularly preferably 1 $\mu$m to 10 mm. This depends on the blowing power and strength of the air stream and the height of the separating device, which is preferably between 10 cm and 100 cm. The collector 12 may be provided with a vibration generator 13 which allows the fine dust particles to be conveyed at a greater velocity.

Thus the blower means preferably provides the initial separation step, while the deflector means preferably provides the final separation step.

A further object of the present invention is to provide a method for separating small fragments from large fragments of semiconductor material, comprising guiding fragments of semiconductor material into and through an active separation zone containing a blower means which provides an initial separation of the small fragments from the large fragments; and providing a final separation of the small fragments from the large fragments by means of a deflector means.

According to the method of invention, a defined weight fraction of a defined fragment grain size is separated and is removed. Preferably, the method according to the invention is used for the separation of polycrystalline or monocrystalline silicon fragments or of fragments of other semiconductor materials, such as gallium arsenide.

An advantage of the invention is that contamination and abrasion resulting from separation in air are reduced. Another advantage is that the special material guidance means and zones allows the irregularly shaped semiconductor fragments to be picked up and reproducibly separated in an identical and controllable manner.

Accordingly, while a few embodiments of the present invention have been shown and described, it is to be understood that many changes and modifications may be made thereunto without departing from the spirit and scope of the invention as defined in the appended claims.

What is claimed is:

1. A separation device for separating small fragments from large fragments of semiconductor material, comprising
    an apparatus having at least one blower means and at least one deflector means for guiding fragments of semiconductor material into and through an active separation zone containing said blower means which provides an initial separation of the small fragments from the large fragments;
    said deflector means providing a final separation of the small fragments from the large fragments;
    wherein the blower means has a plurality of nozzles arranged one above another in a nozzle vertical channel; and
    said nozzle vertical channel having means for vertical displacement of said nozzles.

2. The device as claimed in claim 1, wherein the deflector means has means for horizontal displacement and has means for vertical displacement.

3. The device as claimed in claim 1, wherein said blower means has means for horizontal displacement of the nozzles, and said blower means has means for pivotable displacement of the nozzles.

4. A method for separating small fragments from large fragments of semiconductor material, comprising
    guiding fragments of semiconductor material into and through an active separation zone containing a blower means which provides an initial separation of the small fragments from the large fragments;
    providing a final separation of the small fragments from the large fragments by using a deflector means; and
    wherein the blower means has a plurality of nozzles arranged one above another in a nozzle vertical channel;
    said nozzle vertical channel having means for vertical displacement of said nozzles.

5. The method as claimed in claim 4, comprising removing a defined weight fraction of a defined fragment size.

6. A separation device for separating small fragments from large fragments of semiconductor material, comprising
    an apparatus having at least one blower means and at least one deflector means for guiding fragments of semiconductor material into and through an active separation zone containing said blower means which provides an initial separation of the small fragments from the large fragments; and said deflector means providing a final separation of the small fragments from the large fragments;
    wherein the deflector means has means for horizontal displacement and has means for vertical displacement; and
    wherein the deflector means comprises a roof having arms connected to bearing pins; and
    said bearing pins fitting within vertical bearing channels to permit vertical displacement of said roof.

7. A method for separating small fragments from large fragments of semiconductor material, comprising
    guiding fragments of semiconductor material into and through an active separation zone containing a blower means which provides an initial separation of the small fragments from the large fragments; and
    providing a final separation of the small fragments from the large fragments by using a deflector means;
    wherein the deflector means has means for horizontal displacement and has means for vertical displacement; and
    wherein the deflector means comprises a roof having arms connected to bearing pins; and
    said bearing pins fitting within vertical bearing channels to permit vertical displacement of said roof.

* * * * *